United States Patent [19]

Biasotto et al.

[11] Patent Number: 4,968,205
[45] Date of Patent: Nov. 6, 1990

[54] ROUND HAYBALE UNLOADER

[75] Inventors: Bernard Biasotto, St-Casimir; Louis Germain, Comté Portneuf, both of Canada

[73] Assignee: WIC Inc., Canada

[21] Appl. No.: 268,766

[22] Filed: Nov. 9, 1988

[51] Int. Cl.$^5$ .............................................. A01D 87/12
[52] U.S. Cl. .............................. 414/24.6; 242/86.5 R; 414/538
[58] Field of Search ................... 414/24.5, 24.6, 537, 414/538, 559, 571, 911; 242/86.5 R

[56] References Cited

U.S. PATENT DOCUMENTS

| | | | |
|---|---|---|---|
| 2,849,130 | 8/1958 | Van Der Velde | 414/537 |
| 3,632,054 | 1/1972 | Heppelmann et al. | 414/24.6 X |
| 3,958,772 | 5/1976 | Hynson | 242/86.5 R |
| 3,964,621 | 6/1976 | Youngkamp | 414/911 X |
| 4,025,006 | 5/1977 | Turnbow | 242/86.5 R |
| 4,042,140 | 8/1977 | McFarland | 414/911 X |
| 4,044,967 | 8/1977 | Guichon | 242/86.5 R |
| 4,078,733 | 3/1978 | Popiolek | 241/200 |
| 4,195,958 | 5/1980 | Vahlkamp et al. | 414/24.6 |
| 4,266,899 | 5/1981 | Skeem | 414/24.6 |
| 4,360,167 | 11/1982 | Beccalori et al. | 241/101 A |
| 4,441,845 | 4/1984 | Gibson | 414/24.6 |
| 4,538,948 | 9/1985 | Melton | 414/24.6 |
| 4,575,303 | 3/1986 | Lindell | 414/911 X |
| 4,687,402 | 8/1987 | Zatylny | 414/24.6 |

FOREIGN PATENT DOCUMENTS 1038338  9/1978  Canada .

Primary Examiner—Robert J. Spar
Assistant Examiner—Janice Krizek
Attorney, Agent, or Firm—Larson and Taylor

[57] ABSTRACT

A haybale unloader is disclosed for transporting and unwinding cylindrical bales of hay or like material. The invention provides a compact, self-powered and self-propelling unloader for unrolling a continuous sheet of agricultural material from a bale. The unloader allows for convenient transport of bales and is easily operated by a single person. The unloader comprises a wheeled frame on which are disposed a support surface for a bale and a conveyor having a forward discharge end and rearward receiving end. A limiting surface is disposed adjacent the receiving end of the conveyor and extends upwardly therefrom in an obtuse angle relationship thereto. A pair of freely pivoting bale retaining arms is provided for rotatably retaining the bale against the support surface and limiting surface. A clamping disk and spear assembly is disposed at each free terminal end of the arms and is adapted for slidable and rotatable interconnection therewith and for engagement with the respective end surfaces of a bale near its central longitudinal axis. The conveyor unrolls a bale placed onto the support surface by imparting a rotative movement to the bale about its central longitudinal axis and drawing therefrom a continuous sheet of agricultural material for distribution along the ground adjacent the discharge end of the conveyor.

28 Claims, 3 Drawing Sheets

ROUND HAYBALE UNLOADER

The present invention relates in general to a round haybale unloader for transporting and unwinding cylindrical bales of hay, straw or like fibrous agricultural material. More particularly, the invention relates to a compact, self-powered and self-propelling apparatus for unrolling a continuous sheet of hay from a cylindrical bale.

Traditionally, loose haystacks were employed for the storage of harvested forage crops. However, with the advent of increasingly high costs for agricultural labour, the use of loose haystacks gave way to more efficient methods of gathering and mechanically compressing hay and other fibrous agricultural material into small rectangular-section bales. These parallelopiped bales typically measure 30 centimeters by 45 centimeters in cross-section and one meter in length.

More recently, the conventional parallelopiped bales have been replaced by much larger cylindrical bales of up to 2 meters in diameter and 1.5 to 2 meters in length. Typically, such cylindrical bales may weigh as much as 1000 kilograms, thereby permitting a much greater quantity of agricultural material to be gathered and stored in one operation. For instance, round bales may be lifted and transported by a single tractor operator using a simple forklift attachment.

Although the introduction of round bales has generally promoted a reduction in the amount of labour required in the gathering and storing stages associated with harvesting, these round bales, on account of their size and weight, have presented numerous problems in achieving efficient separation and distribution of the rolled agricultural material for use in livestock feeding and dairying operations. For example, round bales are more cumbersome to manipulate, especially in the closed quarters typically encountered in stallings or barns. Furthermore, unlike conventional rectangular bales, round bales are not as easily amenable to a controlled distribution by manual intervention, since such bales are in the nature of a continuously wound sheet of compacted fibres.

A variety of agricultural implements have been proposed and developed to date to meet the demand for an apparatus having the capability of distributing large cylindrical haybales in a flexible, efficient and controlled manner. However, a number of the prior art distribution devices do not unroll a continuous sheet of agricultural material from a round bale but employ cutting means for shredding or tearing away the fibrous material from which the bale is composed. Such machines may require powerful and expensive cutting implements and may lead to excessive wasting of the shredded or cut material distributed therewith which tends to be rather fine and hence amenable to displacement on a windy day.

A number of the prior art unloading devices are conceived in fixed configurations which are not intended nor well-suited for the handling and transport of bales. Other prior art machines, even though adapted for the handling, transport and unloading of cylindrical bales, are not self-powered and, therefore, may require coupling to the power-take-off of a conventional farm tractor in order to drive their various mechanical or hydraulic components. Moreover, almost invariably, these prior art devices are not self-propelling, so that the manoeuvering of the prior art bale unloaders must be made by way of another attached vehicle such as a tractor. In either of the latter two cases, the prior art devices are somewhat cumbersome in operation and particularly difficult to employ indoors or wherever enhanced manoeuvrability is required or desired.

The present invention overcomes the above-mentioned disadvantages of the prior art devices by providing a relatively compact, self-powered and self-propelling haybale unloader for unrolling a continuous sheet of agricultural material from a cylindrical bale, which haybale unloader allows for convenient transport of bales and is easily operated by a single person.

According to a broad aspect of the present invention, there is provided a self-powered and self-propelling compact haybale unloader for transporting and unrolling a single cylindrical bale of hay or like agricultural material, said haybale unloader comprising:

a structural frame mounted onto a plurality of wheels;

a support surface disposed on said structural frame for supporting said bale on said bale unloader;

conveyor means connected to said structural frame and having a forward discharge end and rearward receiving end;

a limiting surface disposed adjacent said receiving end of said conveyor means and extending upwardly therefrom;

bale securing means for rotatably retaining said bale against said support surface and said limiting surface;

steering means for directing said haybale unloader, said steering means constituting means for steering said unloader along a narrow steering radius; and drive source means operatively connected to said conveyor means and to one or more of said wheels for actuation thereof; and an operator support means disposed rearwardly of said limiting surface;

whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

According to a second broad aspect of the invention, there is provided a self-powered and self-propelling compact haybale unloader for transporting and unrolling a single cylindrical bale of hay or like agricultural material, said haybale unloader comprising:

a structural frame mounted onto a plurality of wheels;

bale support means disposed on said structural frame;

bale securing means for rotatably retaining said bale against said bale support means;

steering means for directing said haybale unloader, said steering means constituting means for steering said unloader along a narrow steering radius; and drive source means operatively connected to said bale support means and to one or more of said wheels for actuation thereof; and an operator support means disposed rearwardly of said limiting surface;

whereby said bale support means supports a bale placed thereon and unrolls said bale by imparting thereto a rotative movement about the central longitudinal axis thereof and drawing therefrom a continuous sheet of said hay or like agricultural material for distribution thereof along the ground, and said bale securing means stabilizing said rotative movement of said bale throughout the unrolling thereof.

According to a third broad aspect of the invention, there is provided a self-powered and self-propelling haybale unloader for transporting and unrolling a cylindrical bale of hay or like agricultural material, said haybale unloader comprising: a structural frame mounted onto a plurality of wheels; a support surface disposed on said structural frame for supporting said bale on said bale unloader; conveyor means connected to said structural frame and having a forward discharge end and a rearward receiving end; a limiting surface disposed adjacent said receiving end of said conveyor means and extending upwardly therefrom; bale loading means for loading said bale onto said support surface, said loading means comprising winch means and retractable ramp means, said winch means being operatively connected to said drive source means for actuation thereof; steering means for directing said haybale unloader, said steering means being operatively connected to one or more of said wheels; and drive source means operatively connected to said conveyor means and to one or more of said wheels for actuation thereof; whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

According to a fourth broad aspect of the invention, there is provided a self-powered and self-propelling haybale unloader for transporting and unrolling a cylindrical bale of hay or like agricultural material, said haybale unloader comprising: a structural frame mounted onto a plurality of wheels; a support surface disposed on said structural frame for supporting said bale on said bale unloader; loading means for loading said bale onto said support surface; conveyor means connected to said structural frame and having a forward discharge end and a rearward receiving end, said support surface and said conveyor means being upwardly inclined towards said forward discharge end of said conveyor means, said conveyor means comprising an endless conveyor having at least two continuous chains connected in spaced-apart relationship by means of a plurality of transverse members, and whereby said transverse members move over said support surface from said receiving end to said discharge end of said conveyor means; a limiting surface disposed adjacent said receiving end of said conveyor means and extending upwardly therefrom in an obtuse angle relationship thereto; bale securing means for rotatably retaining said bale against said support surface and said limiting surface, said bale securing means comprising a laterally-spaced apart pair of pivoting retaining arms, said retaining arms each having a pivot end and a free end, said pivot ends being rotatably attached to said haybale unloader about a common horizontal axis transversely disposed, said free ends being slidably and rotatably interconnected to clamping means for opposed engagement with the end surfaces of a bale carried on said support surface, said pivot ends of said retaining arms each providing a fixedly attached transverse axle for slidable engagement into corresponding annular pivot sleeves disposed on said haybale unloader, said retaining arms being removably attached and providing adjustment means for adjusting the lateral spacing thereof to thereby accommodate different sizes of bales, said adjustment means being a hole and pin arrangement comprising at least one pair of opposed circumferential slots disposed on each one of said pivot sleeves, said slots being adapted to receive a pin for slip-fit engagement with any one of a plurality of holes radially disposed through said transverse axle of said retaining arm at spaced-apart intervals along the length of said transverse axle; steering means for directing said haybale unloader, said steering means being operatively connected to one or more of said wheels; and drive source means operatively connected to said chains of said conveyor means and to one or more of said wheels for actuation thereof; whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

In its preferred embodiment, the invention comprises a wheeled structural frame, on which is disposed a support surface for a haybale placed thereon and endless conveyor means having a forward discharge end and a rearward receiving end. The support surface and conveyor means are preferably upwardly inclined in the direction of discharge. In order to arrest the rearward movement of the bale along the inclined support surface, a limiting surface is provided adjacent the lowermost receiving end of the conveyor means and extends upwardly therefrom.

A bale securing means is also provided, and may comprise a laterally spaced apart pair of freely pivoting retaining arms. The retaining arms are pivoted about a common horizontal axis preferably disposed adjacent the uppermost end of the limiting surface. A clamping disc and spear assembly is provided at each free terminal end of the retaining arms and is adapted for slidable and rotatable interconnection therewith. The clamping disk and spear assemblies of each retaining arm are conceived for secure attachment to the respective end surfaces of a cylindrical bale, at or near the central longitudinal axis thereof. Means are preferably provided for permitting removal of the retaining arms during the loading of a bale onto the support surface and for adjusting the lateral spacing of the arms in order to accomodate various sizes of bales.

The conveyor means, when activated, imparts a rotative motion to a bale placed onto the support surface, and unrolls the bale by circumferentially drawing therefrom a continuous sheet of compacted material of which the bale is composed. The drawn bale material is distributed along the ground upon leaving the discharge end of the conveyor. The bale securing means retains the bale against the support surface and limiting surface in such manner as to permit the controlled and stable rotation of the bale about its central longitudinal axis. As the diameter of the bale is progressively reduced during the course of the unloading process, the freely pivoting feature of the retaining arms, and the slidable nature of the clamping disk and spear assemblies connected thereto, permit each rotatable clamping disc and spear assembly to continuously follow the central longitudinal axis of the unrolling bale.

Steering means are provided in order to facilitate a controlled distribution of the agricultural material by suitably directing the motion of the wheeled frame during the unrolling process. For instance, the self-powered and self-propelling haybale unloader may be successively displaced along a desired path in a direction opposite to that of discharge of the conveyor means.

Winch means and a retractable loading ramp assembly may be provided with the haybale unloader of the present invention. The loading ramp assembly may consist of a pair of elongate members, each respectively provided with a protruding lip or similar means at one end thereof, permitting attachment to slots disposed at opposite ends of the front bumper surface of the unloader frame. When not in use, the members may be slidably received and stored in corresponding channelar slots or other holding means disposed at the lateral outside surfaces of the structural frame.

In drawings which illustrate one preferred embodiment of the present invention:

Figure 1:
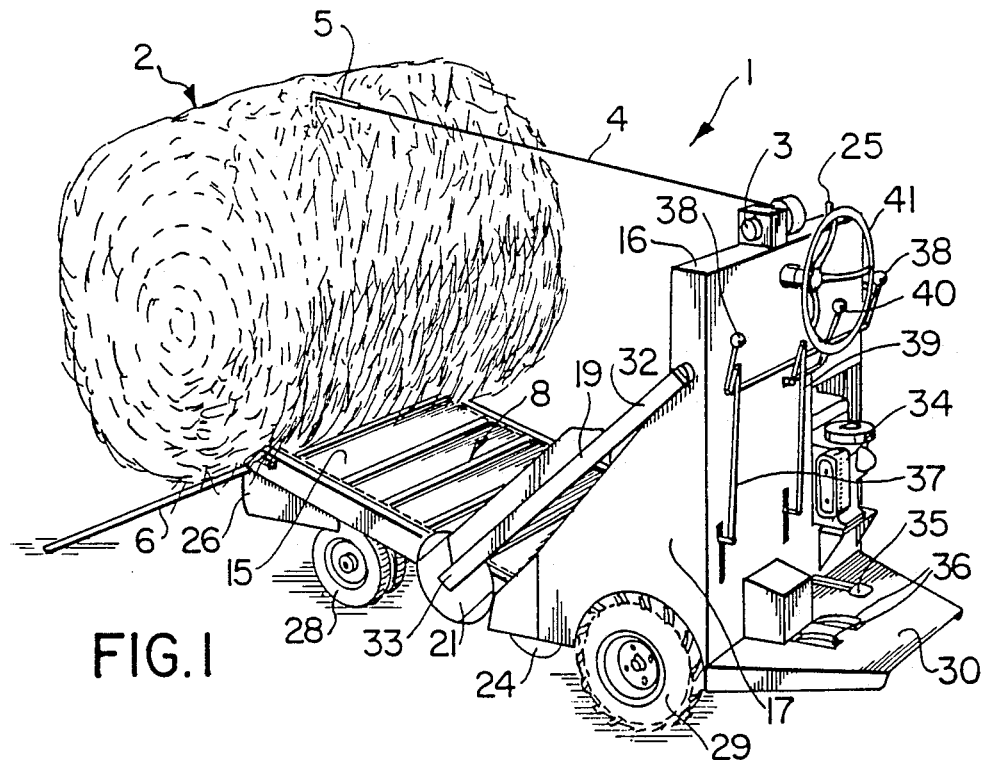
FIG. 1 is a perspective view of the haybale unloader of the invention illustrating the loading of a bale thereon.

Referring now to the drawings, there is shown in FIG. 1 a preferred embodiment of the haybale unloader of the present invention, compendiously labelled 1. The haybale unloader 1 comprises a structural frame 7 to which is attached a support surface 15 for supporting a bale placed onto the haybale unloader. The structural frame 7 is itself mounted onto a plurality of wheels. The wheels preferably comprise a steered front wheel assembly 28 and a pair of driven rear wheels 29, which rear wheels are attached to a journalled axle rotatably secured to the structural frame 7 by way of conventional bearings or the like. Adjacent the rear wheels 29, there is provided a horizontally disposed operator platform 30. An upright housing structure or power housing or power housing 17 is mounted onto the structural frame 7 and encloses a drive source means for the various driven components of the haybale unloader, which drive source means and driven components are described in greater detail hereinbelow.

A cylindrical bale 2 may be conveniently loaded onto the haybale unloader by the use of winch means comprising a conventional winch 3 disposed on the upper surface 16 of power housing 17. Alternatively, the winch may be located within the power housing, as at 46 (FIG. 3). The winch 3 provides a steel cable 4 and hook 5 for attachment to the outer surface of the bale.

In conjunction with winch means as aforesaid, retractable ramp means are provided for directing the bale onto the haybale unloader. The ramp means may consist of a pair of rectangular cross-sectioned ramp members 6 adapted to attach to the front bumper surface 26 of the frame 7. For instance, a protruding lip may be provided at the attachment end of each of the ramp members 6, permitting slip-fit engagement with corresponding slots laterally spaced apart at opposite ends of the front bumper surface 26 of frame 7. Upon completion of loading, the members are removed and may be slidably received into channelar slots which may be disposed adjacent the lateral outer surfaces 27 of the frame. The protruding lip feature of the ramp members 6 also functions as a stop for arresting the insertion of the ramp members into the channelar slots. When the winch means are not in use, hook 5 may be stored onto a hook receptacle 25, disposed adjacent the winch 3. If desired, a safety grid (not shown) may be mounted onto the upper surface 16 of the power housing 17 for providing greater security of operation in conjunction with the winch 3. The safety grid may be pivotally attached so as to enable the retraction thereof whenever added vertical clearance is required.

It will be apparent to those skilled in this art that other means for loading a bale onto the haybale unloader of the present invention may be substituted for the winch means and retractable ramp assembly discussed above. Alternatively, if no winch means and ramp assembly are provided, then loading of the bale may be accomplished using the fork lift attachment of a farm tractor or other conventional means.

Figure 2:
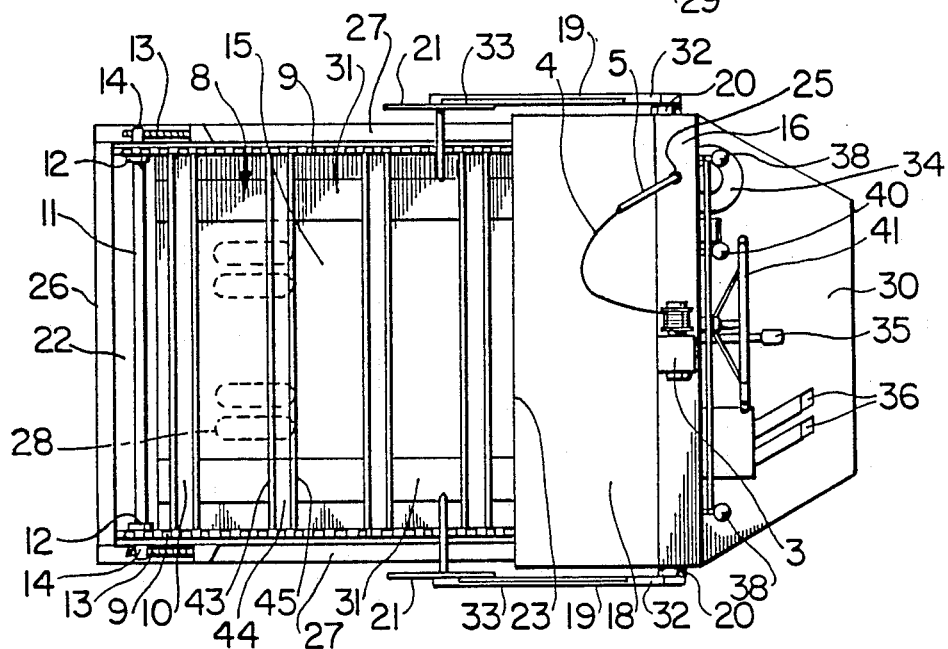
FIG. 2 is a top plan view of the haybale unloader of FIG. 1 without a bale.

Endless conveyor means 8 are provided, having a forward discharge end 22 and a rearward receiving end 23 for agricultural material that is circumferentially drawn from a haybale and distributed along the ground in the manner more fully described hereinbelow. The conveyor means 8 and support surface 15 are preferably inclined in the direction of discharge and comprise two chains 9 which are connected in spaced apart relationship by means of a plurality of transverse members 10 having a generally asymmetrical U-shaped cross-sectional configuration. Each transverse member 10 comprises a central web portion 44 and two flange portions extending upwardly therefrom, the height of leading flange portion 43 being less than that of trailing flange portion 45. As shown in FIG. 2, the chains 9 run over a pair of guide sprocket wheels 12 which are rotatably mounted onto a stationary front shaft 11, which shaft is attached to the structural frame 7 adjacent the discharge end 22 of the conveyor means 8. If desired, bearings may be disposed between the free guide sprocket wheels 12 and the fixed front shaft 11. The terminal ends 14 of the front shaft 11 extend transversely through slots longitudinally disposed on each lateral surface 27 of the structural frame 7. Threaded support bolts 13 are attached to the frame adjacent the slots and are adapted to extend through corresponding apertures disposed at each terminal end 14 of the front shaft 11. A pair of opposed nuts (not shown) may be disposed at either side of each terminal end 14 of the shaft 11 on the threaded bolts 13 for adjustment of the tension in the chains 9 of the conveyor means 8.

Two additional sprocket wheels for the chains 9 are keyed onto a second transverse shaft (not shown) which is journalled in the structural frame adjacent the receiving end 23 of the conveyor means. The second shaft is rotatably supported by a pair of bearings which are fixedly attached to the structural frame. A drive sprocket 24, shown partially exposed in FIG. 1, is keyed to the second shaft at one terminal end thereof. The drive sprocket 24 is chain driven from drive source means located within the power housing 17 and described in greater detail hereinafter.

Upon activation of the conveyor means 8, the spaced apart chains 9 are driven over the guide sprockets 12 and transverse members 10 connectedly disposed between chains 9 are caused to slidably advance towards the discharge end 22 of the conveyor means 8 and over the surface of slip plates 31 longitudinally disposed along the entire length of support surface 15 adjacent each of the outside lateral edges thereof. At the discharge end 22 of the conveyor means 8, each transverse member 10 passes downwardly and under the support surface 15, thereby reversing direction and returning towards the receiving end 23 of the conveyor means 8. At the receiving end, each returning transverse member 10 again reverses direction and passes upwardly through a slot provided adjacent the lower end of the limiting surface 18 in order to slidably advance onto the slip plates 31 of the support surface 15 towards the discharge end 22 as aforesaid.

A limiting surface 18 is provided adjacent the receiving end of the conveyor means 8 and extends therefrom in a preferably obtuse angle relationship. The limiting surface 18 arrest the rearward movement of the haybale placed onto the inclined support surface 15.

It is to be understood that various other conveyor means may be employed for use with the present invention. Those skilled in the art will appreciate that in some such instances, the conveyor means itself may constitute the support surface or limiting surface for the bale.

A bale securing means is provided and may comprise a spaced-apart pair of pivoting retaining arms 19. The retaining arms 19 each provide a transverse axle 53 (FIGS. 4a to 4c) at the terminal pivot ends 32 thereof for slidable engagement into corresponding annular pivot sleeves 20 disposed on the lateral surfaces of power housing 17 adjacent the uppermost end of the limiting surface 18.

A clamping disk and spear assembly 21 is adapted for slidable and rotatable engagement with the free terminal end 33 of each retaining arm 19, for instance, by means of a slip-fit sleeve interconnection well known to those skilled in this art. Bearings may be disposed between the clamping disk and spear assembly and the slidable sleeve insert so that the former assembly freely rotates thereon. The clamping disk and spear assemblies are conceived to opposedly engage with the substantially flat end surfaces of a haybale in the vicinity of the central longitudinal axis thereof, as shown more fully in FIG. 3b.

Figures 4A, 4B, 4C:
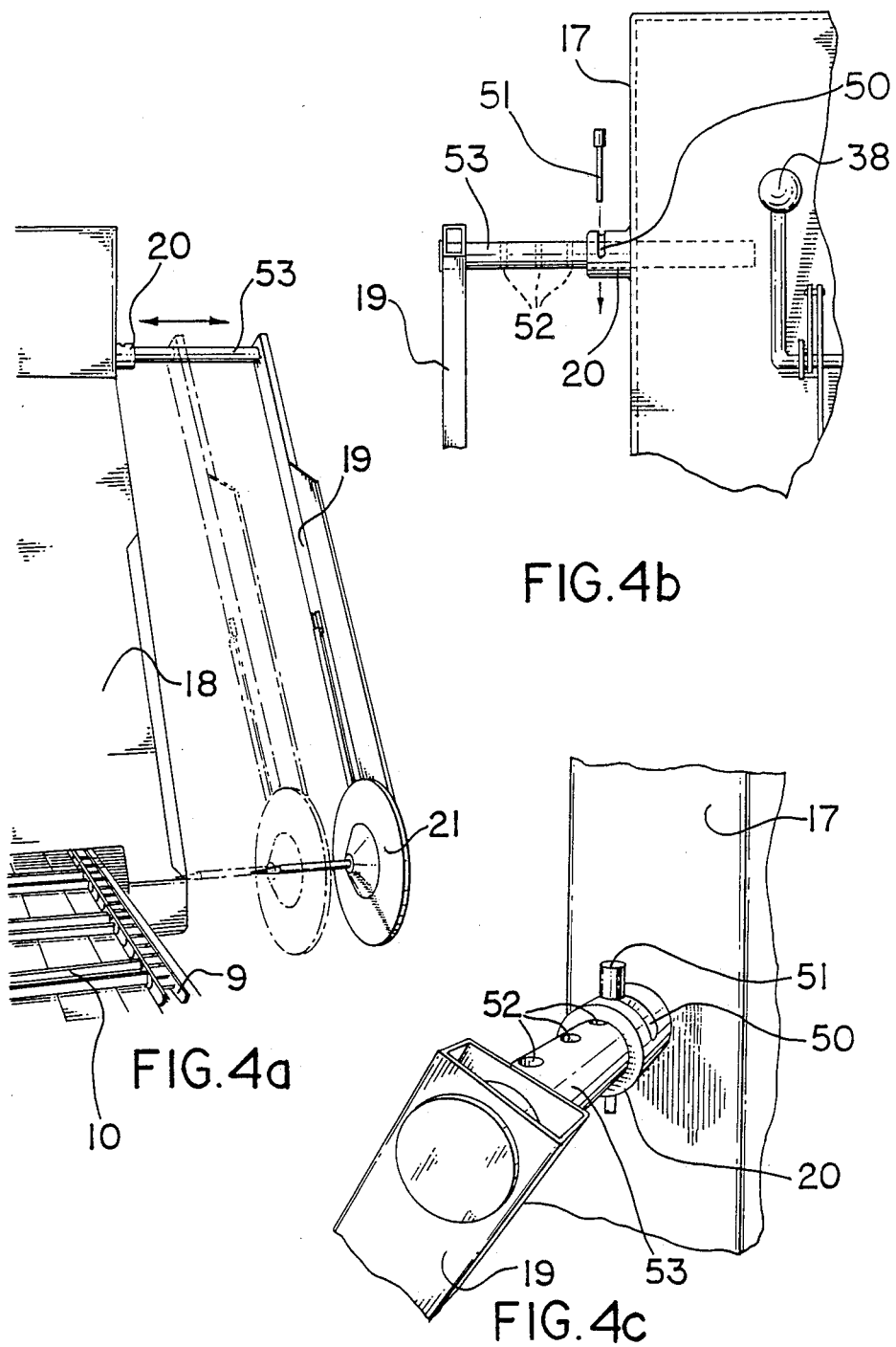
FIG. 4a is a partial perspective view of the haybale unloader of FIG. 1, showing the lateral adjustment of a retaining arm therefor in two positions by way of dotted lines and solid lines, respectively.
FIG. 4b is a partial elevational view of the retaining arm shown in FIG. 4a, depicting means for adjusting the lateral position thereof.
FIG. 4c is a detailed perspective view of the retaining arm of FIG. 4a, also depicting the adjustable means of FIG. 4b.

As shown in FIGS. 4a to 4c, means may be preferably provided for permitting removal of the retaining arms 19 from the pivot sleeves 20. Such removal facilitates the loading of a bale onto the unloader. Additionally, means may be provided for adjustment of the lateral spacing between the arms. For instance, the removal and adjustment means may consist of a hole and pin arrangement, whereby each pivot sleeve 20 is provided with a pair of opposed circumferential slots 50 adapted to receive a cylindrical pin 51 for slip-fit engagement with any one of a plurality of holes 52 radially drilled through the retaining arm transverse axle 53 at spaced-apart intervals along the length thereof. Other such removal and adjustment means will be familiar to those skilled in the art.

The bale securing means of the present invention stabilizes the rotation of the bale and the unrolling thereof in a number of ways. First, the bale securing means maintains the bale laterally centered on the support surface 15. Second, the bale is held by the bale securing means so that the longitudinal axis of the bale remains transverse to the forward discharge direction of the conveyor means and hence substantially parallel to the transverse members 10 thereof. Third, the bale securing means prevents the rotating bale from advancing on the support surface 15 in the direction of discharge of the conveyor means. Fourth, a constant pressure of the bale against the conveyor means is maintained throughout the unrolling process by way of the bale securing means. In addition to all of the foregoing, the bale securing means also acts to statically retain the bale on the support surface 15 during the transport of the bale to the site of distribution.

The drive source means for use with the present invention may consist of a gasoline or diesel engine 34 which powers primary drive means such as a main drive shaft rotatably mounted within the power housing 17. A clutch or other similar means such as a belt and idler arrangement are preferably employed to selectively interrupt power transmission from the engine 34 to the main drive shaft, and may be operated by the use of a foot pedal 35. Such an arrangement may facilitate the starting of the engine by not subjecting it to initial loading by the driven components of the haybale unloader.

The main drive shaft may be keyed to accept a plurality of pulleys with drive belts for powering any number of secondary drive shafts. One such secondary drive shaft may power a reversible hydraulic pump for directly driving a hydrostatic transmission and differential. The hydrostatic transmission and differential in turn drives an axle to which the rear wheels 29 are attached. Paired foot pedals 36 may be arranged onto the operator platform 30 for selecting forward or rearward transmission of power to the rear wheels from the hydrostatic transmission and differential.

The foot pedals 36 may also be employed to select the amount of power transmitted to the rear wheels, to thereby control the forward or rearward speed of the haybale unloader. Thus, increasing the downward displacement of either pedal 36 will increase the speed of the vehicle in the chosen direction of movement. Moreover, when neither pedal 36 is depressed and the main drive shaft is engaged, the hydraulic transmission advantageously operates as a braking device to slow the motion of the haybale unloader.

Another secondary drive shaft may be employed to power, by chain drive means, drive sprocket 24 for the conveyor means 8. An idler pulley or the like may be arranged in order to engage the secondary drive shaft of the conveyor means. The idler pulley position may be controlled by the use of a suitable lever and linkage arrangement 37, partially shown in FIG. 1, to which may be connected a pair of control handles 38 mounted onto the rear surface of the power housing 17.

Yet another secondary drive shaft may be disposed within the power housing for driving the winch 3. In like manner to the drive arrangement described above for the conveyor means 8, chain drive means may be employed for powering the winch 3. An idler roller or similar means of engaging the secondary drive shaft for driving the winch may be controlled by a second lever and linkage arrangement 39 connected to a single control handle 40 mounted onto the rear surface of the power housing 17. Power housing 17 is preferably provided, at its rear surface, with a suitable access panel (not shown) in order to facilitate the maintenance and repair of the haybale unloader. It is to be understood that numerous alternative drive source means, whether mechanical, hydraulic or electrical in nature, may be adapted for use with the present invention.

A steering means is provided for controlling the direction of the haybale unloader. The steering means includes a steering wheel 41 disposed at the rear surface of the power housing 17. The steering wheel 41 is connected, by way of a rotatable horizontal shaft, to a gear box disposed within the power housing 17. The gear box drives a rotatable vertical shaft, substantially extending the height of the power housing 17. The lower terminal end of the vertical shaft may be centrally attached to a horizontally disposed sprocket which drives a length of chain. At each terminal end of the chain may be attached a length of steel cable for connection to the steered wheel assembly 28.

The steered wheel assembly 28 comprises a wheel housing (not shown) having a front axle for supporting a plurality of front wheels, preferably four in number. The wheel housing may be rotatably attached about a vertical axis to the underside of the structural frame 7. Bearings are preferably disposed between the contacting surfaces of the wheel housing and structural frame 7. The wheel housing, at each of its lateral surfaces, provides lugs or similar means for connecting the lengths of steel cable described above at opposed ends of a horizontal axle parallel to that of the front axle of the steered wheel assembly. As shown in FIGS. 1 and 2 of the drawings, the steered wheel assembly 28 is preferably disposed inwardly of the front bumper surface 26 of frame 7 with the front wheels therefor being disposed in a close lateral configuration so as to permit the steering of the haybale unloader along a relatively small turning radius. In this manner, the unloader according to the present invention may be advantageously employed indoors or wherever enhanced maneuverability is required. Other steering means suitable for use with the haybale unloader of the present invention will be readily apparent to those skilled in this art.

Figure 3A:
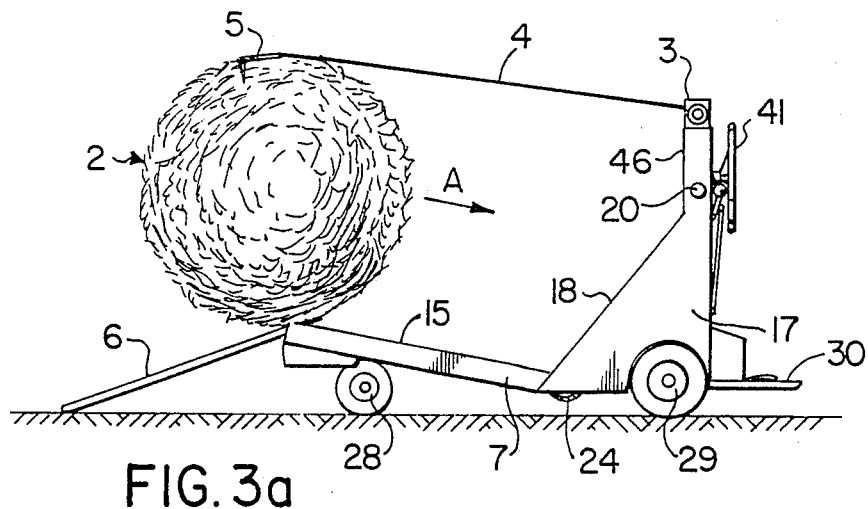
FIGS. 3a, 3b and 3c are side elevational views of the haybale unloader of the present invention successively illustrating the various stages in the operation of the invention.
Figure 3B:
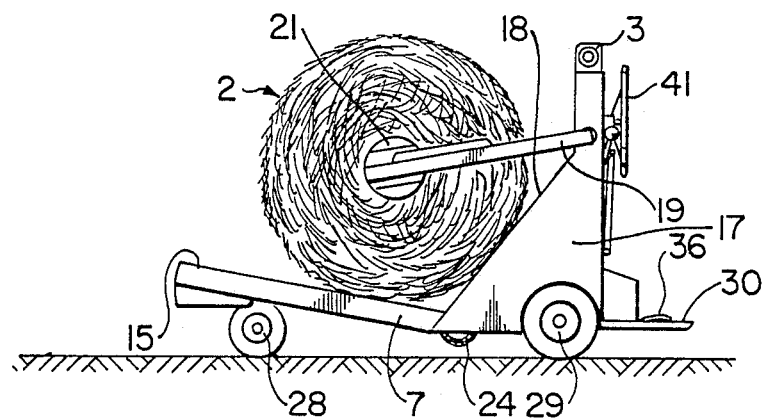
Figure 3C:
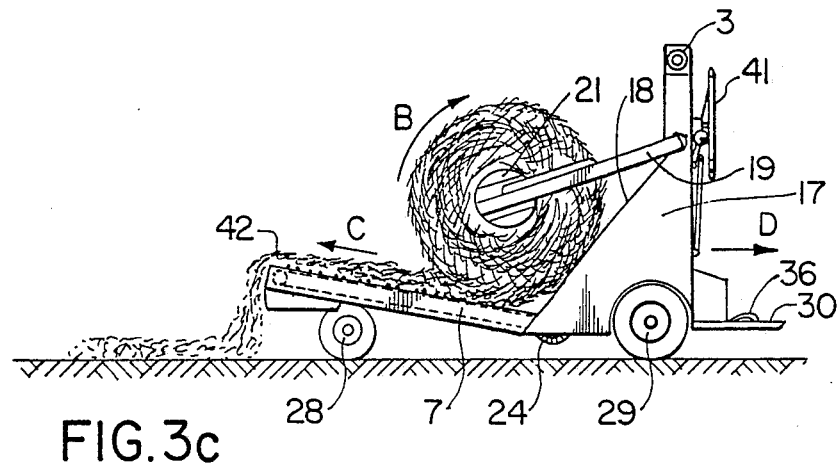

The operation of the haybale unloader of the present invention is illustrated successively in FIGS. 3a, 3b and 3c. In FIG. 3a, a cylindrical bale 2 is shown in the process of being placed onto the support surface 15 of the haybale unloader as previously described with the use of winch means and a retractable ramp assembly. To load the bale, the ramp members 6 are removed from their storage slots and attached to the front bumper surface 26 of the structural frame 7. Cable 4 is wrapped half-way around the circumference of the bale so as to engage hook 5 therein. The winch 3 operates so as to pull the bale 2 in the direction of arrow A, successively unwrapping cable 4 as the bale is drawn up the ramp members 6.

When the loading process has been completed, the ramp members 6 are replaced in their storage slots and the hook 5 is disengaged from the bale and is returned to its hook receptacle 25. In the case of FIG. 3a, the retaining arms 19 have been removed from the pivot sleeves 20 in order to facilitate the loading of the bale. It is to be noted that the bale 2 must be loaded onto the support surface 15 in the direction of rolling of the bale in order to permit the eventual unrolling thereof. Referring now to FIG. 3b, once the bale 2 has been placed upon the support surface 15 and is in contact with the limiting surface 18, the retaining arms 19 are replaced into the pivot sleeves 20 and adjusted as to lateral spacing so as to accommodate the length of the particular bale 2 to be unwound. The freely slidable and rotatable clamping disk and spear assemblies 21 are oppositely engaged with the bale 2 at each of its substantially flat surfaces in the vicinity of the central longitudinal axis thereof. Secured in this manner, the bale is ready for unloading or for transportation to the site of distribution.

The unloading process is illustrated in FIG. 3c. To begin the unrolling process, the conveyor means 8 are activated by the use of control handles 38. The advancing transverse members 10 of the conveyor means 8 frictionally impart a rotative motion to the bale 2 in the direction of arrow B. The conveyor means 8 circumferentially draw a continuous sheet 42 of compacted material from the rotating bale. The drawn bale material advances towards the discharge end of the conveyor means 8 in the direction of arrow C and is distributed along the ground upon leaving the discharge end of the conveyor. As previously described, the freely pivoting retaining arms 19 stabilize the unrolling action of the bale, restrict the bale from advancing towards the direction of discharge and maintain an effective pressure of the bale against the conveyor means. The stabilizing and restrictive function of the retaining arms is maintained throughout the course of the unrolling process, as the clamping disk and spear assemblies 21 remain securely affixed to the substantially flat ends of the bale.

The controlled distribution of the drawn bale material may be achieved by suitably steering the haybale unloader during the unrolling process, for instance, in the direction of arrow D opposite to that of discharge. The density of distributed material discharged to the ground by the conveyor means may be effectively controlled by varying the speed of the haybale unloader in the direction of arrow D. Thus, decreasing the speed of the vehicle relative to the unrolling action of the bale will tend to increase the density of distributed agricultural material, whereas increasing that speed will tend to decrease the density of distribution. If desired or required, the haybale unloader may be operated in the forward discharge direction during the unrolling process, that is, in the direction opposite to that of arrow D. The steering wheel 41 and control pedals 36 as described above may be used for the purpose of directing the haybale unloader and its speed of movement. As shown in the drawings, operator platform 30 is disposed rearwardly of the limiting surface so as to permit an operator for the haybale unloader to generally face in the direction of discharge of the drawn bale material, denoted by arrow C of FIG. 3c.

Various changes may be made to the embodiments described herein without departing from the scope of the present invention which is limited only by the following claims.

The embodiments of the invention in which an exclusive property or privilege is claimed are defined as follows:

1. A self-powered and self-propelling compact haybale unloader for transporting and unrolling a single cylindrical bale of hay or like agricultural material, said haybale unloader comprising:
    a structural frame mounted onto a plurality of wheels;
    a support surface disposed on said structural frame for supporting said bale on said haybale unloader;

conveyor means connected to said structural frame and having a forward discharge end and a rearward receiving end;

an upright housing structure extending upwardly from said conveyor means in the vicinity of said rearward receiving end;

a limiting surface disposed adjacent a first side of said upright housing structure and extending upwardly from said receiving end of said conveyor means;

bale securing means for rotatably retaining said bale against said support surface and said limiting surface;

steering means for directing said haybale unloader, said steering means constituting means for steering said unloader along a small steering radius;

drive source means operatively connected to said conveyor means and to one or more of said wheels for actuation thereof, at least a portion of said drive source means being contained in said upright housing structure;

an operator support means disposed rearwardly of said limiting surface and adjacent a second side of said upright housing structure opposite to said first side thereof;

whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

2. A haybale unloader according to claim 1, wherein loading means are provided for loading a bale onto said support surface.

3. A haybale unloader according to claim 2, wherein said conveyor means comprises an endless conveyor having at least two continuous chains connected in spaced apart relationship by means of a plurality of transverse members, said chains being operatively connected to said drive source means, whereby said transverse members move over said support surface from said receiving end to said discharge end of said conveyor means.

4. A haybale unloader according to claim 3, wherein said support surface and said conveyor means are upwardly inclined towards said forward discharge end of said conveyor means.

5. A haybale unloader according to claim 4, wherein said limiting surface extends upwardly from said receiving end of said conveyor means in an obtuse angle relationship thereto.

6. A haybale unloader according to claim 2, wherein said bale securing means comprises a laterally spaced apart pair of pivoting retaining arms, said retaining arms each having a pivot end and a free end, said pivot ends being rotatably attached to said haybale unloader about a common horizontal axis transversely disposed, said free ends being slidably and rotatably interconnected to clamping means for opposed engagement with the end surfaces of a bale carried on said support surface.

7. A haybale unloader according to claim 5, wherein said bale securing means comprises a laterally spaced apart pair of pivoting retaining arms, said retaining arms each having a pivot end and a free end, said pivot ends being rotatably attached to said haybale unloader about a common horizontal axis transversely disposed, said free ends being slidably and rotatably interconnected to clamping means for opposed engagement with the end surfaces of a bale carried on said support surface.

8. The haybale unloader according to claim 7, wherein said pivot ends of said retaining arms each provide a fixedly attached transverse axle for slidable engagement into corresponding annular pivot sleeves disposed on said haybale unloader.

9. A haybale unloader according to claim 7, wherein said clamping means comprises a clamping disk and spear assembly.

10. A haybale unloader according to claim 7, wherein said retaining arms are removably attached.

11. A haybale unloader according to claim 7, wherein said retaining arms provide adjustment means for adjusting the lateral spacing thereof to thereby accomodate different sizes of bales.

12. A haybale unloader according to claim 8, wherein said retaining arms are removably attached and provide adjustment means for adjusting the lateral spacing thereof to thereby accomodate different sizes of bales.

13. A haybale unloader according to claim 2, wherein said loading means comprises winch means and retractable ramp means, said winch means being operatively connected to said drive source means for actuation thereof.

14. A haybale unloader according to claim 3, wherein said loading means comprises winch means and retractable ramp means, said winch means being operatively connected to said drive source means for actuation thereof.

15. A haybale unloader according to claim 13, wherein said retractable ramp means comprises at least two elongate members, said members being adapted to attach at the terminal ends thereof to the outside front surface of said structural frame of said haybale unloader so as to extend therefrom in a longitudinally spaced apart relationship, said members being stored in corresponding channelar slots disposed along the lateral outside surfaces of said structural frame.

16. A haybale unloader according to claim 3, wherein one or more of said wheels are disposed in a steered wheel assembly, said steered wheel assembly having a wheel housing for rotatably supporting said one or more wheels, said wheel housing being rotatably attached to the underside of said structural frame about a vertical axis adjacent said discharge end of said conveyor means and being operatively connected to said steering means.

17. A haybale unloader according to claim 3, wherein at least two of said wheels are attached to an axle journalled in said structural frame and disposed adjacent said receiving end of said conveyor means, said axle being operatively connected to said drive source means for actuation thereof.

18. A haybale unloader according to claim 16, providing operator controls for activating said conveyor means and said loading means, for selecting the forward or rearward direction of movement of said haybale unloader and adjusting the speed thereof, and for operating said steering means.

19. A self-powered and self-propelling compact haybale unloader for transporting and unrolling a single cylindrical bale of hay or like agricultural material, said haybale unloader comprising:

a structural frame mounted onto a plurality of wheels;

an upright housing structure extending upwardly from said structural frame;

bale support means disposed on said structural frame adjacent a first side of said upright housing structure;

bale securing means for rotatably retaining said bale against said support means;

steering means for directing said haybale unloader, said steering means constituting means for steering said unloader along a small steering radius;

drive source means operatively connected to said bale support means and to one or more of said wheels for actuation thereof, at least a portion of said drive source means being contained in said upright housing structure; and an operator support means disposed adjacent a second side of said upright housing structure opposite to said first side thereof;

whereby said bale support means supports a bale placed thereon and unrolls said bale by imparting thereto a rotative movement about the central longitudinal axis thereof and drawing therefrom a continuous sheet of said hay or like agricultural material for distribution thereof along the ground, and said bale securing means stabilizing said rotative movement of said bale throughout the unrolling thereof.

20. A haybale unloader according to claim 19, wherein said bale support means comprises a conveyor means and a limiting surface, said conveyor means having a forward discharge end and a rearward receiving end, said limiting surface arresting the rearward motion of a bale placed onto said conveyor means.

21. A self-powered and self-propelling haybale unloader for transporting and unrolling a cylindrical bale of hay or like agricultural material, said haybale unloader comprising:

a structural frame mounted onto a plurality of wheels;

a support surface disposed on said structural frame for supporting said bale on said haybale unloader;

conveyor means connected to said structural frame and having a forward discharge end and a rearward receiving end;

a limiting surface disposed adjacent said receiving end of said conveyor means and extending upwardly therefrom;

bale securing means for rotatably retaining said bale against said support surface and said limiting surface;

loading means for loading said bale onto said support surface, said loading means comprising winch means and retractable ramp means, said winch means being operatively connected to said drive source means for actuation thereof;

steering means for directing said haybale unloader, said steering means being operatively connected to one or more of said wheels; and drive source means operatively connected to said conveyor means and to one or more of said wheels for actuation thereof;

whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

22. A haybale unloader according to claim 21, wherein said conveyor means comprises an endless conveyor having at least two continuous chains connected in spaced apart relationship by means of a plurality of transverse members, said chains being operatively connected to said drive source means, whereby said transverse members move over said support surface from said receiving end to said discharge end of said conveyor means.

23. A haybale unloader according to claim 21, wherein said retractable ramp means comprises at least two elongate members, said members being adapted to attach at the terminal ends thereof to the outside front surface of said structural frame of said haybale unloader so as to extend therefrom in a longitudinally spaced apart relationship, said members being stored in corresponding slots disposed along the lateral outside surfaces of said structural frame.

24. A haybale unloader according to claim 18, wherein said one or more wheels actuated by said drive source means are disposed between said limiting surface and said operator support means; and wherein said steered wheel assembly is disposed underneath said conveyor means.

25. A haybale unloader according to claim 18, wherein said operator support means consists of a horizontal platform disposed near ground level; wherein paired foot pedals are arranged on said platform for selecting transmission of power to one or more of said wheels in either the forward or the rearward direction; wherein control handles are respectively provided for operating said conveyor means and a winch means of said loading means; and wherein a steering wheel is provided for controlling said steered wheel assembly, said control handles and said steering wheel each being disposed adjacent said upright housing structure at a vertically spaced apart distance from said platform.

26. A self-powered and self-propelling haybale unloader for transporting and unrolling a cylindrical bale of hay or like agricultural material, said haybale unloader comprising:

a structural frame mounted onto a plurality of wheels;

a support surface disposed on said structural frame for supporting said bale on said bale unloader;

loading means for loading said bale onto said support surface;

conveyor means connected to said structural frame and having a forward discharge end and a rearward receiving end, said support surface and said conveyor means being upwardly inclined towards said forward discharge end of said conveyor means, said conveyor means comprising an endless conveyor having at least two continuous chains connected in spaced-apart relationship by means of a plurality of transverse members, and whereby said transverse members move over said support surface from said receiving end to said discharge end of said conveyor means;

a limiting surface disposed adjacent said receiving end of said conveyor means and extending upwardly therefrom in an obtuse angle relationship thereto;

bale securing means for rotatably retaining said bale against said support surface and said limiting surface, said bale securing means comprising a laterally-spaced apart pair of pivoting retaining arms, said retaining arms each having a pivot end and a free end, said pivot ends being rotatably attached to said haybale unloader about a common horizontal axis transversely disposed, said free ends being slidably and rotatably interconnected to clamping means for opposed engagement with the end surfaces of a bale carried on said support surface, said pivot ends of said retaining arms each providing a fixedly attached transverse axle for slidable engagement into corresponding annular pivot sleeves disposed on said haybale unloader, said retaining arms being removably attached and providing adjustment means for adjusting the lateral spacing thereof to thereby accommodate different sizes of bales, said adjustment means being a hole and pin arrangement comprising at least one pair of opposed circumferential slots disposed on each one of said pivot sleeves, said slots being adapted to receive a pin for slip-fit engagement with any one of a plurality of holes radially disposed through said transverse axle of said retaining arm at spaced-apart intervals along the length of said transverse axle;

steering means for directing said haybale unloader, said steering means operatively connected to one or more of said wheels; and drive source means operatively connected to said chains of said conveyor means and to one or more of said wheels for actuation thereof;

whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

27. A self-powered and self-propelling compact haybale unloader for transporting and unrolling a single cylindrical bale of hay or like agricultural material, said haybale unloader comprising:

a structural frame mounted onto a plurality of wheels;
a support surface disposed on said structural frame for supporting said bale on said unloader;
conveyor means connected to said structural frame and having a forward discharge end and a rearward receiving end;
a limiting surface disposed adjacent said receiving end of said conveyor means and extending upwardly therefrom;
bale securing means for rotatably retaining said bale against said support surface and said limiting surface;
loading means for loading said bale onto said support surface;
steering means for directing said haybale unloader, said steering means constituting means for steering said unloader along a small steering radius;
drive source means operatively connected to said conveyor means and to one or more of said wheels for actuation thereof; and
an operator support means disposed rearwardly of said limiting surface;
whereby said conveyor means unrolls said bale placed onto said support surface by imparting a rotative movement to said bale about the central longitudinal axis thereof and drawing therefrom a continuous sheet of said hay or like agricultural material for distribution thereof along the ground adjacent said discharge end of said conveyor means, said limiting surface arresting the rearward motion of said bale, and said bale securing means stabilizing said rotative movement of said bale throughout the unrolling thereof.

28. A self-powered and self-propelling compact haybale unloader for transporting and unrolling a single cylindrical bale of hay or like agricultural material, said haybale unloader comprising:

a structural frame mounted onto a plurality of wheels;
bale support means disposed on said structural frame;
bale securing means for rotatably retaining said bale against said support means;
loading means for loading said bale onto said bale support means;
steering means for directing said haybale unloader, said steering means constituting means for steering said unloader along a small steering radius;
drive source means operatively connected to said bale support means and to one or more of said wheels for actuation thereof; and
an operator support means disposed adjacent said bale support means;
whereby said bale support means supports a bale placed thereon and unrolls said bale by imparting thereto a rotative movement about the central longitudinal axis thereof and drawing therefrom a continuous sheet of said hay or like agricultural material for distribution thereof along the ground, and said bale securing means stabilizing said rotative movement of said bale throughout the unrolling thereof.

* * * * *